(No Model.)
R. T. JOY.
LAWN SPRINKLER.
No. 546,537.  Patented Sept. 17, 1895.
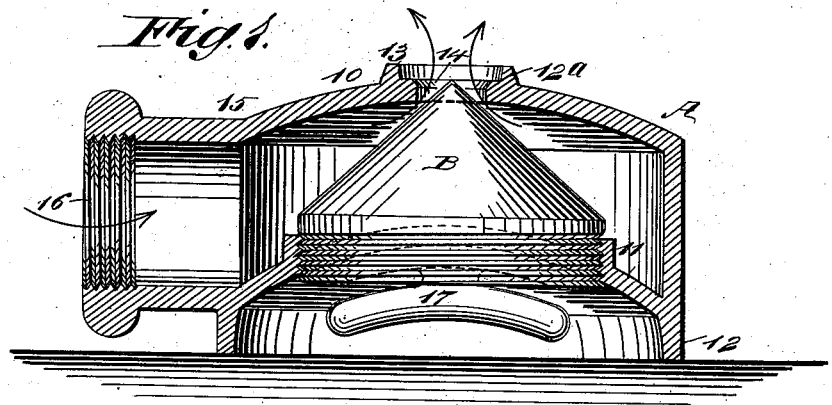
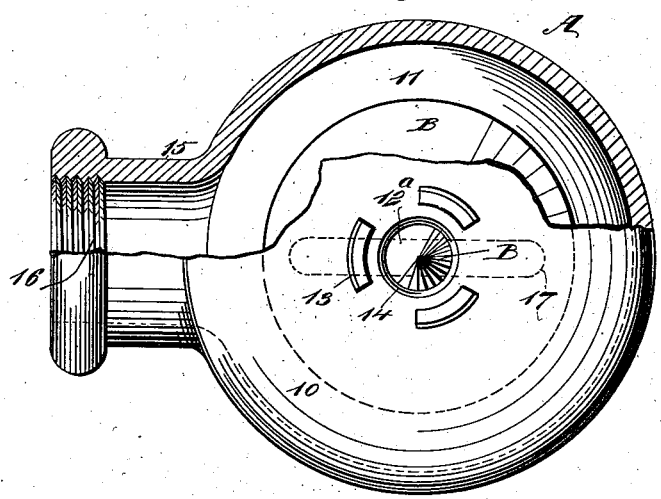
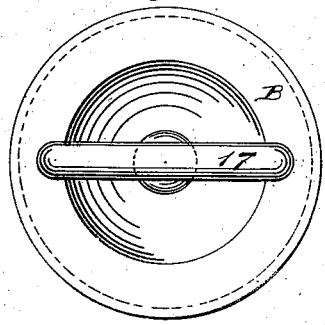
WITNESSES:
INVENTOR
BY
ATTORNEYS.

UNITED STATES PATENT OFFICE.

RUSSELL T. JOY, OF TACOMA, WASHINGTON.

LAWN-SPRINKLER.

SPECIFICATION forming part of Letters Patent No. 546,537, dated September 17, 1895.

Application filed July 10, 1894. Serial No. 517,089. (No model.)

*To all whom it may concern:*

Be it known that I, RUSSELL T. JOY, of Tacoma, in the county of Pierce and State of Washington, have invented a new and Improved Lawn-Sprinkler, of which the following is a full, clear, and exact description.

My invention relates to an improvement in lawn-sprinklers, and it has for its object to provide a sprinkler which will be simple, durable, and economic in its construction, and one wherein the spray may be regulated, the sprinkler comprising virtually but two working parts; and a further object of the invention is to provide a sprinkler which may be used upon a lawn or similar place without detriment to the sod, and which may be conveniently and expeditiously moved from place to place.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a vertical central section through the body of the sprinkler, the spraying-cone being shown in side elevation. Fig. 2 is a plan view of the sprinkler, a portion of the top being broken away; and Fig. 3 is a bottom plan view of the cone.

In carrying out the invention the sprinkler may be said to consist practically of a casing A and a separating or sprinkling cone B. The casing A is provided with an arched top 10 and a correspondingly-shaped bottom 11, while the general contour of the casing is preferably circular, and the said casing is provided with a flange 12 at the margin of its bottom, whereby the arched bottom partition 11 will be removed a predetermined distance from the surface upon which the casing may be made to rest. The arched bottom or partition 11 is provided with an opening at its center of predetermined diameter, the diameter of the opening, however, being usually quite large, and the arched top 10 is provided with a small central opening $12^a$, surrounded by segmental ribs 13, the said ribs being removed from the wall of the opening $12^a$, and the upper portion of said wall is beveled in an outward direction, as illustrated at 14 in Figs. 1 and 2.

The casing is further provided with a neck 15 at one side, and the said neck is adapted to receive the coupling of a hose, and to that end is fitted with an interior thread 16. The cone B is made with an exteriorly-threaded base, which is screwed into the opening in the bottom 11 of the casing, and the apex of the cone is centered in the opening $12^a$ at the top of the casing. The cone is provided at its bottom with a handle 17, whereby it may be adjusted—that is to say, it may be screwed upwardly or downwardly, so that more or less of its apex shall be contained within the top opening $12^a$ of the casing. The further the apex of the cone extends into the opening $12^a$ the finer will be the spray, whereas, when the cone is screwed downward, being removed from the opening $12^a$, the water will be delivered either partially in a spray and sheet form or substantially in a sheet; but the water delivered through the opening $12^a$ of the casing will be broken by impinging upon the flanges or ribs 13, the said flanges serving likewise as guards for the apex of the cone.

By reason of the casing being made with an arched bottom the handle 17 of the cone will not strike the sod or surface upon which the casing may be placed, especially so since the bottom flange 12 of the casing is made sufficiently high or deep to prevent such a contingency.

Having thus described my invention, I claim as new and desire to secure by Letters Patent—

1. A lawn sprinkler, comprising a casing having a central outlet opening in its top, a raised bottom provided with a threaded opening, a supporting flange or projection around the lower edge of the case below said bottom, an inlet opening at one side to which the hose or supply pipe may be coupled, and a cone having a threaded base screwed adjustably in said threaded bottom opening and provided with means for rotating it from the exterior of the case, the apex of the cone entering the outlet aperture, substantially as described.

2. In a lawn sprinkler, the combination, with a casing provided with a water inlet and an outlet, and guard flanges surrounding the outlet, the outer wall of the outlet being outwardly inclined, of a spreading or spraying cone, provided with a threaded base, the base being adjustably located in the bottom of the casing, the apex of the cone entering the said outlet, and a means for adjusting said cone, as and for the purpose specified.

3. In a lawn sprinkler, the combination, with a casing having an arched top and bottom, a flange at the bottom adapted to rest upon a support, the bottom being provided with a threaded opening, the top with a water outlet and the side with a water inlet, the outlet in the casing being surrounded by guards, of a spreading or spraying cone having a threaded base, adjustably screwed into the aperture in the bottom of the casing, the apex of the cone entering the said outlet, and a handle by means of which the cone may be turned, as and for the purpose specified.

RUSSELL T. JOY.

Witnesses:
GEORGE H. WALKER,
J. AUSTIN WOLVERT.